United States Patent [19]

Munetika

[11] Patent Number: 4,901,953
[45] Date of Patent: Feb. 20, 1990

[54] CONTROLLER FOR RAILWAY VEHICLES

[75] Inventor: Kazuyoshi Munetika, Kobe, Japan

[73] Assignee: Nippon air Brake Co., Ltd., Kobe, Japan

[21] Appl. No.: 204,067

[22] Filed: Jun. 8, 1988

[30] Foreign Application Priority Data

Jun. 12, 1987 [JP] Japan .............................. 62-91036[U]

[51] Int. Cl.⁴ ............................................. B60T 13/66
[52] U.S. Cl. .................................. 246/182 R; 188/83;
246/183
[58] Field of Search ............... 246/182 R, 182 A, 183;
188/83

[56] References Cited

U.S. PATENT DOCUMENTS

| | | | |
|---|---|---|---|
| 2,373,225 | 4/1945 | Clickner .................................. | 188/83 |
| 2,445,607 | 7/1948 | Ghetto .................................... | 188/83 |
| 2,743,714 | 5/1956 | Hanson, Jr. et al. ................... | 188/83 |

FOREIGN PATENT DOCUMENTS 5758906 9/1980 Japan .
61-54966 4/1986 Japan .

*Primary Examiner*—Andres Kashnikow
*Assistant Examiner*—Matthew C. Graham
*Attorney, Agent, or Firm*—J. O. Ray, Jr.

[57] ABSTRACT

A railway vehicle controller apparatus having a housing in which a rotatable shaft having a first portion positioned within the housing and a second portion extending out of the housing is provided. A control mechanism is connected to the second portion of such rotatable shaft. Such control mechanism is operable by an operator of such railway vehicle. A detection unit is positioned within the housing to detect a rotational position of the rotatable shaft. The detection unit includes a unit to provide an electrical signal indicative of such rotational position of the rotatable shaft. Such a signal is used as an acceleration or deceleration command. A control resistance mechanism engages the rotatable shaft to provide a controlled resistance to rotation of such rotatable shaft.

15 Claims, 2 Drawing Sheets

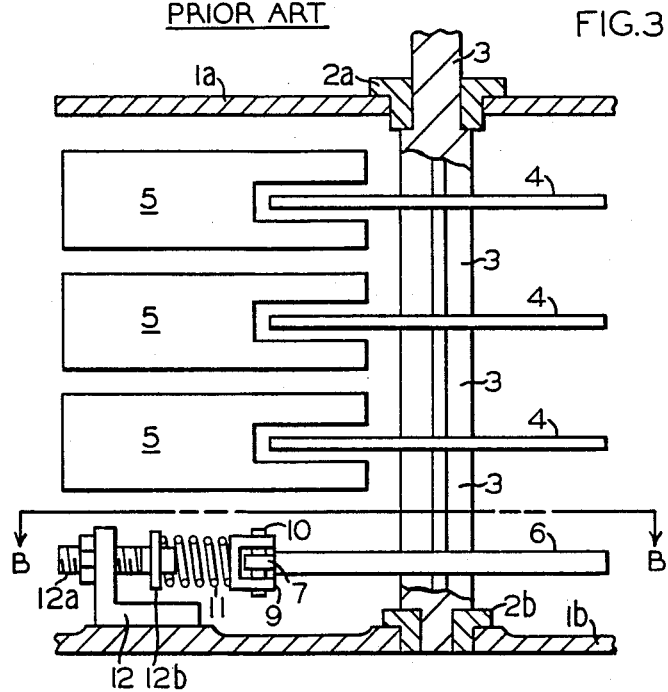
PRIOR ART  FIG. 3
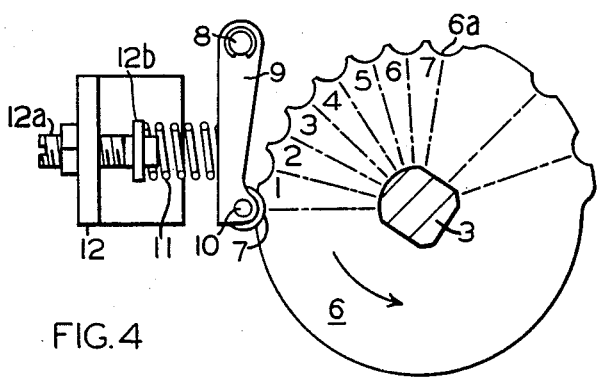
PRIOR ART
FIG. 4

CONTROLLER FOR RAILWAY VEHICLES

FIELD OF THE INVENTION

The present invention relates, in general, to railway vehicles' control apparatus and, more particularly, this invention relates to a brake on main control apparatus installed in a control stand of a railway vehicle to output at least one of deceleration or acceleration commands as an electrical signal at predetermined positions of the control apparatus as determined by a control operation performed by the operation of the railway vehicle.

BACKGROUND OF THE INVENTION

Brake and/or main control equipment for use in railway vehicles have been known in the prior art. See, for example, Japanese publication Jitsukaisho 57-58906 and jitsukaisho 61-54966. The control equipment taught in these publications is representative of the prior art control equipment and are illustrated in FIGS. 3 and 4 of this application.

As shown in FIG. 3, the prior art control device includes an upper cover designated 1a and a lower cover designated 1b. The upper cover 1a and lower cover 1b each constitute a portion of the main body of the prior art control device. Through bearings designated 2a, which are engageable with the upper cover 1a, and 2b, which are engageable with the lower cover 1b, a rotatable shaft 3 is positioned between such upper cover 1a and lower cover 1b for free rotation. A control wheel or handle which has not been illustrated in FIG. 3, is attached to the projecting end of such rotatable shaft 3.

Multiple numbers of boards 4 which are provided for detection are mounted at approximately a perpendicular orientation to the rotating shaft 3 (left-right direction in the figure). The rotating shaft 3 which is interlocked with the handling operation and the contactless switch 5 which detects the rotational position of each of those boards 4 for detection is mounted on the side wall (not shown) of the main body. When the board 4 for detection rotates following the operation of the handle, the contactless switch 5 detects the location and outputs an electrical signal which serves as either a deceleration or acceleration command.

In addition, the above-mentioned detection board 4 can be replaced by a light blocking board, and the contactless switch 5 by a transparent light switch, or the detection board 4 can also be replaced by a reflecting board and the contactless switches 5 by a reflective light switch. Furthermore, the board 4 for detection and the contactless switch 5 may consist of a proximity body and proximity switch respectively.

Even in a controller apparatus using the contactless method for position detection, as in the case of the contact-type controller apparatus using conventional cam and cam switch, a similar control resistance addition mechanism is used, as shown in FIGS. 3 and 4. The case of the brake controller is illustrated in FIG. 4.

On the periphery of the star wheel 6 fixed approximately perpendicular to the axial direction of the rotating shaft 3, there are grooves 6a in locations corresponding to each of the handling locations. The numbers 1–7 indicated on this star wheel 6 are the respective step positions of the conventional braking range of a railway vehicle. In this prior art controller apparatus, the roller 7 that makes contact with the outer periphery of the star wheel 6 is supported so that it can rotate freely by means of a pin 10, at the tip of a lever 9 which is axially supported by a pin 8 at the base on the main body side. In order to press this roller 7 against the outer periphery of star wheel 6, there is a spring 11 installed between the support body 12, attached to the main body and the above lever 9. Here, 12a is an adjusting screw and 12b is a spring receiver.

In this prior art mechanism for the addition of control resistance, the roller 7 is pressed into the groove 6a of the star wheel 6 by the force of spring 11, and when the roller 7 tries to slip out of groove 6a, the spring 11 is compressed, and the roller 7 tends to maintain its position in the groove 6a, and the reaction which takes place in the star wheel 6 at this point is the control resistance. Therefore, by rotating the rotating shaft 3 to the position where the roller 7 fits in the groove 6a, by a control action, that position can be ascertained.

This prior art controller apparatus has certain problems in that, when this controller is the brake controller, there are grooves 6a on the outer periphery of the star wheel 6, corresponding to the respective positions of steps 1–7 of the standard operation of the railway vehicle braking range. When the control handle is set to steps 1–7 of the normal braking range of the railway vehicle, the roller 7 engages and disengages from the groove 6a to produce digital handling resistance of the ON-OFF mode and the control resistance of this digital type response gives an unfamiliar feeling to operators who are more accustomed to the pneumatically-controlled brake valve which is different from the controller apparatus in question. Also, when this controller apparatus is the main controller, the power control range is divided into 1–4 steps or 1–7 steps and there are numerous grooves 6a on the outer periphery of the star wheel 6, which again gives an unfamiliar feeling to operators, like the case described above.

In order to eliminate this unfamiliar feeling, grooves 6a corresponding to each step of the standard braking range on the power control range may be eliminated, and the surface of the outer periphery which corresponds to the star wheel may be made smooth, without projections and recesses.

However, if the face is uniform, the roller 7 in contact with this face rotates freely. Its rolling resistance is very low, and since the control position detection mechanism is of the contactless type, and has no switching resistance like the conventional contact type, and furthermore, since the rotating shaft 3 is supported only by bearings 2a and 2b, the control resistance becomes extremely low, and it becomes difficult to maintain the control handle at a desired step position of the standard braking band or power band.

One approach may be to make the roller 7 be of the fixed type and also to make the force of the spring 11 stronger, but then, since the contact area of the outer periphery of the star wheel 6 and the roller 7 is small and the surface pressure per unit area becomes very high, there will be a problem of excessive wear on these parts in contact.

SUMMARY OF THE INVENTION

The present invention is a controller apparatus useful in a railway vehicle. Such controller includes a rotating shaft that is connected to a control mechanism which is operated by an operator of such railway vehicle. A portion of the rotating shaft is positioned within and secured to the main body portion of such controller in a manner such that it can rotate freely. At a position which is approximately perpendicular to the axial direction of the ratching shaft, at least one board and preferably a number of boards are secured thereto. At least one contactless switch and preferably a contactless switch for each board to detect the relative rotational position of such at least one board is secured to the main body portion of the controller apparatus. Such contactless switch as it detects the rotating position of the board generates and transmits an electrical signal value that is used as a command for one of deceleration and/or acceleration of such railway vehicle. The controller apparatus further includes a control resistance mechanism positioned adjacent and encompassing one end of the rotating shaft. A first friction member having a friction surface thereon is secured to such rotating shaft intermediate the ends thereof and in a position approximately perpendicular to its axial direction. A second friction member having a friction surface thereon for mating engagement by the friction surface of the first friction member is secured to the control resistance mechanism on the main body side of the controller apparatus. A spring is positioned in such a manner to press the friction surfaces of the first friction member and the second friction member, respectively, against one another.

OBJECTS OF THE PRESENT INVENTION

It is, therefore, one of the primary objects of the present invention to provide a controller apparatus for a railway vehicle which includes an enhanced control resistance mechanism.

Another object of the present invention is to provide a controller apparatus for a railway vehicle which minimizes excessive wear on selected component parts of such controller apparatus.

Still another object of the present invention is to provide a controller apparatus for a railway vehicle in which a control resistance mechanism can be adjusted to control the amount of resistance encountered in movement, by an operator of such railway vehicle, of the control handle on such controller apparatus.

Yet another object of the present invention is to provide a controller apparatus for a railway vehicle in which manufacture of a star wheel forming a part of such controller apparatus is simpler due to the elimination of a number of grooves along an outer periphery thereof.

The above and various other objects and advantages of the railway vehicle controller apparatus of the present invention will become more readily apparent to those persons skilled in the railroad control art from the following more detailed description of the invention when such description is taken in conjunction with the attached drawing figures.

BRIEF DESCRIPTION OF THE DRAWINGS

FIG. 3 is a fragmented schematic side elevation view partially in cross section which illustrates a prior art type controller; and FIG. 4 is a schematic plan view taken along lines B—B of FIG. 3.

DETAILED DESCRIPTION OF THE INVENTION

Figure 1:
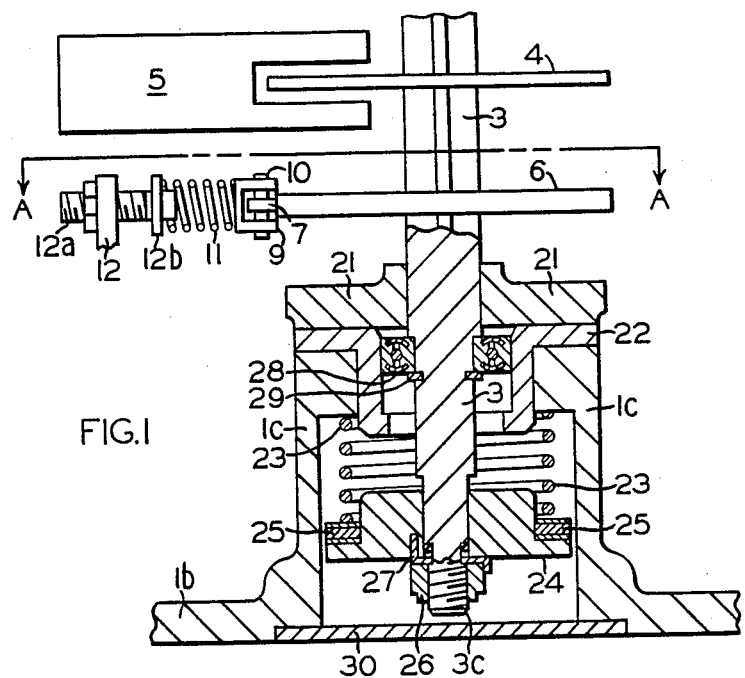
FIG. 1 is a schematic side elevation view partially in cross section which illustrates the essential elements of one presently preferred embodiment of the invention.

Prior to proceeding to a more detailed description of this invention, it should be noted that throughout the several views of the drawing Figures, identical reference numerals have been used to identify identical components of the controller apparatus assembled according to both the present invention and the prior art controller apparatus.

Figure 2:
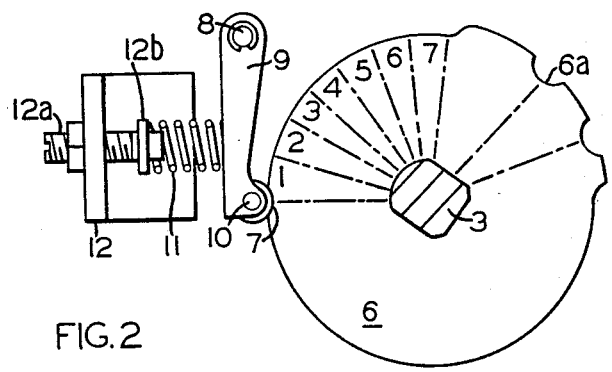
FIG. 2 is a schematic plan view taken along lines A—A of FIG. 1.

Now refer more particularly to FIGS. 1 and 2 for an understanding of one presently preferred embodiment of this invention. In the embodiment illustrated in FIGS. 1 and 2 the controller apparatus is constructed as a railway vehicle brake control assembly.

In this embodiment, as best illustrated in FIG. 2 of the drawings, the outer peripheral portion of the star wheel 6, which corresponds to the step positions 1–7 of the standard braking range of a railway vehicle, is manufactured with a substantially uniform surface. This star wheel 6 in combination with the roller 7, due to such substantially uniform surface of such outer peripheral portion of the star wheel 6, can no longer function efficiently as a control resistance mechanism in such controller apparatus. Because in this embodiment such controller apparatus is used as a railway vehicle brake controller, the star wheel 6 is provided with grooves 6a in order to clarify for an operation of such railway vehicle a brake release position, an emergency application position and a handle extraction position, respectively. Therefore, depending on the condition and particular use of the controller apparatus, of this invention, certain related elements of the star wheel 6 and roller 7 may not be required.

As illustrated in the lower half of FIG. 1, this embodiment of the controller apparatus of the present invention includes a control resistance mechanism for the standard braking range of the railway vehicle to which it is to be applied. The purpose served by such control resistance mechanism will become clear as the description proceeds. Such control resistance mechanism includes a lower cover 1b of the main body. Secured to the lower cover 1b is a generally hollow cylindrical body member 1c which projects inwardly toward the main body (upper side in the drawing) of the controller apparatus. Such cylindrical body member 1c is generally centrally located with respect to the lower cover 1b. A generally hollow receiving member 22 is fixed to the upper side of the cylindrical body member 1c by coupling its small diameter part into the cavity of such cylindrical body member 1c. The top face of the receiving member 22 as illustrated in the drawing serves as a frictional contact face to the friction board 21. Such purpose of such friction board 21 will be explained hereinafter.

The friction board 21, which is preferably circular, faces the outer face of the receiving member 22. Such friction board 21 is secured approximately perpendicular to the axial direction of the rotating shaft 3 (left-right in the drawing). The friction board 21 carries a contact surface for mating frictional engagement with the outer surface of the receiving member 22.

The control resistance mechanism also includes a spring 23 which presses the contact surface of the friction board 21 against the outer surface of the receiving member 22 during operation. The spring 23 is installed between a ledge in the cylindrical body 1c and a spring receiver member 24 secured to a lower end of the rotating shaft 3. Such spring receiver member 24, preferably, has a generally rectangular shape in relationship to the rotating shaft 3. In this manner, such spring receiver member 24 does not rotate against the rotating shaft 3, but slides freely in the axial direction of such rotating shaft 3 (an up-down motion as illustrated in FIG. 1). In addition, on the outer flange of such spring receiver member 24, thrust bearings 29 are positioned to prevent twisting of the spring 23 which would result from direct contact of the spring 23 with the flange portion of the spring receiver member 24.

The force to be exerted by the spring 23 is adjustable by rotation of a nut 26 threadedly engaged with a threaded portion 3a located adjacent the lower end of the rotating shaft 3. A lock washer 27 is provided so that after any adjustment of the force to be exerted by the spring 23 is completed, further accidentical rotation of the nut 26 is prevented.

The controller apparatus of this invention also includes a bearing 28 positioned between the rotating shaft 3 and the receiving member 22. Preferably, such bearing 28 is an unlubricated type bearing. A stopper ring 29 is provided to hold the bearing 28 in place. Also illustrated is a cover 30 that can be placed on and removed from the lower cover 1b. Such cover 30 allowing easy access to the adjustment nut 26 under adjustment of the force to be exerted by the spring 23 is required or at least desirable.

In the embodiment of the invention illustrated in the drawings and described in detail above, the control resistance mechanism of the controller apparatus is mounted on the opposite end of the control handle. However, it should be recognized that this installation position may be on the same side of the control handle as well. In addition, the control resistance mechanism may be positioned at a location intermediate the ends of such rotating shaft 3. In these cases, which would depend on the installation position of such control resistance mechanism, changes may have to be made to certain components. For example, changes may be required in the design of the part to support the receiving member 22, the part to support the spring 23, the location of the cover 30, etc. Moreover, the spring 23, as illustrated, is a compression type spring, but depending on the design of the controller apparatus, such spring 23 could be a tension type spring as well.

Furthermore, other appropriate means may be selected to prevent twisting of the spring 23, adjustment of the force exerted by such spring 23 and to prevent the undesirable rotation of the nut 26, etc.

Although in the embodiment of the invention described above the controller apparatus is a railway vehicle brake controller, such invention can likewise be applied effectively as a main controller.

It can be seen from the above description that the present invention provides a sound technical approach to solve the above-mentioned problems by providing a controller apparatus for railway vehicles which is equipped with a rotating shaft 3 mounted on the main body of such controller apparatus so that it can rotate freely. The rotating shaft 3 is connected to the control operation by an operator of the railway vehicle and includes detection boards 4 that are fixed to the rotating axis of such rotating shaft 3 in an orientation approximately perpendicular to the axial direction. The controller apparatus has contactless switches 5 which are mounted on the main body thereof which detect the rotational position of such above-described detection boards. An electrical signal which is provided by the contactless switch 5 during detection of the rotational movement and position of such detection boards 5 is used as the deceleration and/or acceleration control command. The friction board 21, which forms a part of the control resistance mechanism, is secured to the rotating shaft 3 approximately perpendicular to its axial direction. The receiving member 22 includes a surface which makes contact with a mating surface of such friction board 21 when the plane of one end of the central axial direction of such friction board 21 is installed on the main body of the controller apparatus. The spring 23 exerts a force sufficient to press the surface on such friction board 21 against the mating surface on the receiving member 22.

With this technical approach, since the friction board 21 which is secured to the rotating shaft 3 is pressed against the receiving member 22 and held onto the main body by the spring 23, a suitable handling resistance to maintain the control handle at specified step positions of the normal braking range or acceleration range of the railway vehicle can be achieved. This is accomplished in the present invention by adjusting the force exerted by the spring 23. Moreover, since the contact surface of both the friction board 21 and the receiving member 22 is a plane surface, the unfamiliar feel of the digital type control is substantially eliminated. In addition, because the contact plane is at one end of the control axis of the friction board 21, the contact area is wider, and the plane pressure is smaller than in the case where the contact plane is the peripheral force. An additional advantage of this arrangement is that wear of the contacting parts can be controlled.

While a presently preferred embodiment of the railway vehicle controller apparatus has been described in detail above, it should be obvious to those persons skilled in the railroad control art that various other modifications and adaptations of the present invention can be made without materially departing from the spirit and scope of the appended claims.

I claim:

1. A railway vehicle controller apparatus, said controller apparatus comprising:
   (a) a housing;
   (b) a rotatable shaft having a first portion positioned within said housing and having a second portion extending out of said housing;
   (c) a control mechanism connected to said second portion of said rotatable shaft which is operated by an operator of such railway vehicle, said control mechanism includes a star wheel portion and a roller portion, said star wheel portion has a substantially uniform surface which in combination with said roller portion defines a plurality of step positions of said controller apparatus, said star wheel portion further includes at least one groove portion to clarify at least one position of said controller apparatus;
   (d) at least one detection means positioned within said housing for detecting a rotational position of said rotatable shaft, said detection means including a means for providing an electrical signal indicative of said rotation position of said rotatable shaft, said electrical signal being usable as one of an acceleration and deceleration command signal; and
   (e) a control resistance means engageable with said rotatable shaft for providing a controlled resistance to rotation of said rotatable shaft.

2. A controller apparatus, according to claim 1, wherein said detection means includes:
   (a) a detection board secured to said rotatable shaft and;
   (b) a contactless switch positioned to detect rotational movement of said board and to provide said electrical signal.

3. A controller apparatus, according to claim 1, wherein said controller apparatus includes a plurality of said detection means.

4. A controller apparatus, according to claim 2, wherein said detection means includes:
   (a) a detection board secured to said rotatable shaft and;
   (b) a contactless switch positioned to detect rotational movement of said board and to provide said electrical signal.

5. A controller apparatus, according to claim 1, wherein said control resistance means includes:
   (a) a frictional board secured to said rotatable shaft, said friction board having a friction surface;
   (b) a receiving member having a friction surface positioned to frictionally engage said friction surface of said friction board; and
   (c) means for urging said friction surface on said friction board against said friction surface on said receiving member.

6. A controller apparatus, according to claim 5, wherein said means for urging said friction surface on said friction board against said friction surface on said receiving member is a spring.

7. A controller apparatus, according to claim 6, wherein said spring is a compression spring.

8. A controller apparatus, according to claim 6, wherein said control resistance means further includes a means for adjusting a force exerted by said spring.

9. A controller apparatus, according to claim 8, wherein said control resistance means further includes means for preventing rotational twisting of said spring.

10. A controller apparatus, according to claim 9, wherein said means for preventing said rotational twisting of said spring is a bearing.

11. A controller apparatus, according to claim 10, wherein said means for adjusting a force exerted by said spring is a nut threadedly engaging said rotatable shaft.

12. A controller apparatus, according to claim 11, wherein said control resistance means further includes means to prevent unwanted rotation of said nut.

13. A controller apparatus, according to claim 12, wherein said means to prevent unwanted rotation of said nut is a lock washer.

14. A controller apparatus, according to claim 1, wherein said plurality of step positions defined along said substantially uniform surface is at least four.

15. A controller apparatus, according to claim 14, wherein said star wheel includes at least three groove portions to clarify at least a brake release position, an emergency application position and a handle extraction position.

* * * * *